J. L. HAYES.
TRAP.
APPLICATION FILED AUG. 30, 1910.
990,129.
Patented Apr. 18, 1911.
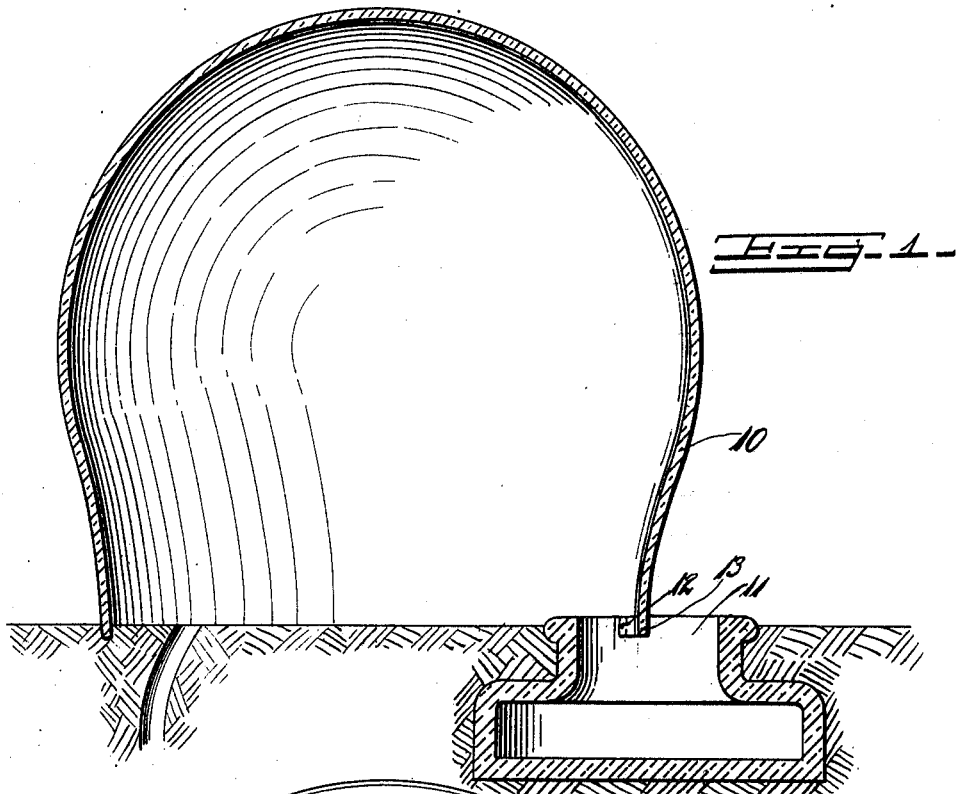
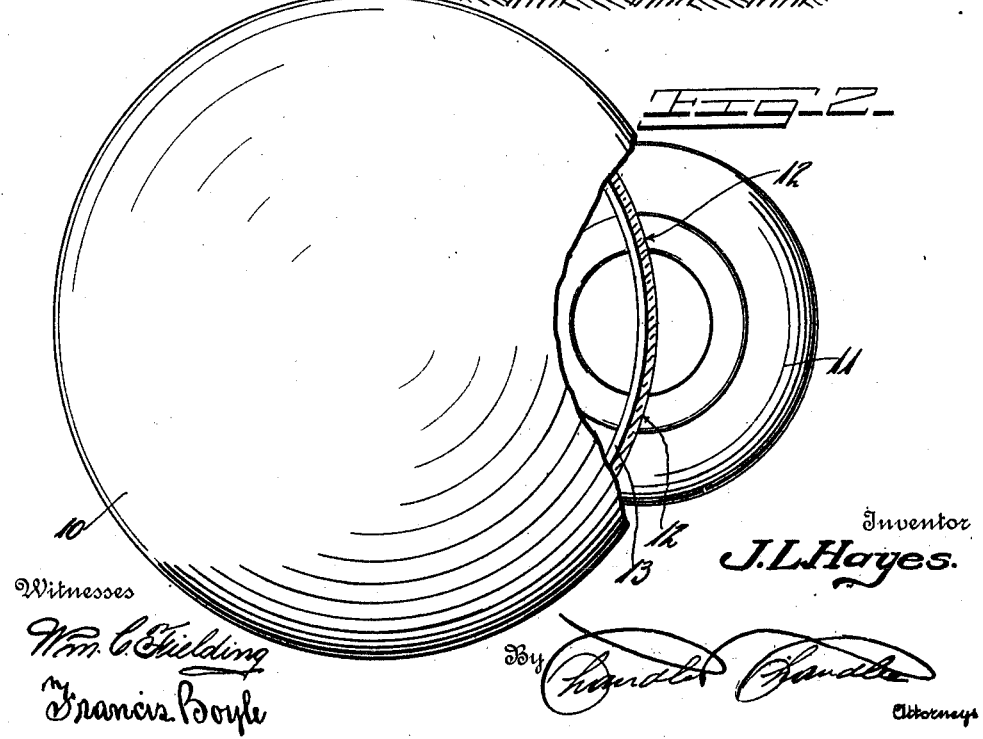
Inventor
J. L. Hayes.

UNITED STATES PATENT OFFICE.

JASPER L. HAYES, OF OLNEY SPRINGS, COLORADO.

TRAP.

990,129.  Specification of Letters Patent.  Patented Apr. 18, 1911.

Application filed August 30, 1910. Serial No. 579,742.

*To all whom it may concern:*

Be it known that I, JASPER L. HAYES, a citizen of the United States, residing at Olney Springs, in the county of Otero, State of Colorado, have invented certain new and useful Improvements in Traps; and I do hereby declare the following to be a full, clear, and exact description of the invention, such as will enable others skilled in the art to which it appertains to make and use the same.

This invention relates to ant traps and has for its object to provide a simple and durable device that will entrap ants as they emerge from or enter their hill, the trap having novel means for permitting of the entrapped ants being readily removed and the trap kept in a sanitary condition.

With the above object in view, the invention consists in the novel details of construction and combination of parts hereinafter fully described and claimed, it being understood that various modifications may be made in the minor details of construction within the scope of the appended claims.

In the accompanying drawings, forming part of this specification:—Figure 1 is a longitudinal sectional view of an ant trap constructed in accordance with my invention, showing the same in applied position. Fig. 2 is a plan view of the trap, showing parts broken away.

Referring now to the drawings, the entrance to the trap is shown to be a hemispherical casing 10, this casing preferably being made of glass to permit of sunlight shining into the interior of the casing so as to present nearly normal daylight conditions in the entrance to deceive and lure the ants into the entrance.

The receiving receptacle of the trap is designated by the numeral 11, and is shown in this instance to be an ordinary wide mouthed bottle. Formed in the rim of the bottle is a pair of alined slots 12. these slots receiving a portion of the edge 13 of the entrance casing 10, and it will be observed that approximately one-half of the open mouth of the bottle is in registration with the interior of the casing and the remaining half of the open mouth is in registration with the exterior of the casing. As shown in Fig. 2, the bottle is designed to be buried in the ground to approximately its rim and the entrance casing is designed to bear with its lower edge upon the ground, a portion of this lower edge as above stated being disposed in the slots in the bottle neck to maintain the entrance casing in proper position. The entrance casing is placed over the ant hill, and ants emerging from the hill will in their endeavor to escape from the entrance casing crawl over the rim of the bottle and be precipitated by the smooth inner walls thereof into the bottom of the bottle. Ants returning to the hill after making a circuit of the lower edge of the cover in a vain endeavor to gain access to the hill will crawl over the exposed outer portion of the bottle rim and likewise be precipitated to the smooth inner walls of the bottle to the bottom of the bottle. When it is desired to remove the captured ants from the bottle, it is simply necessary to remove the entrance casing and replace the bottle with a new bottle until the used bottle has been cleansed. This latter operation may be done by simply inverting the bottle over boiling water or like destroying fluid.

It will be observed that by virtue of a portion of the edge of the entrance receptacle being engaged in the open mouth of the bottle that this edge will present a baffle or obstruction in the path of ants trying to crawl around the rim of the bottle and gain access to the interior of the casing or vice versa.

It is evident that by virtue of the hemispherical shaped entrance casing, ants emerging from their hill or returning to the same, can not climb the curved slippery wall of the glass casing and will circle around the edge of the casing until reaching the open mouth of the bottle and this being the only means of exit or entrance will naturally enter the open mouth of the bottle and be precipitated into the bottom thereof as above described.

What is claimed is:—

1. A trap, including an open bottom entrance casing, and an open topped receiving receptacle positioned at the edge of said casing, the open bottom of the entrance intersecting with the mouth of the receiving receptacle so that part of said mouth is disposed inside and part outside of said entrance.

2. A trap, including a dome like entrance casing, and an open topped receiving receptacle positioned at the edge of said casing, said receptacle having alined slots in its rim receiving a portion of the periphery of said entrance casing, so that part of the receiving receptacle mouth is disposed inside and part outside of said entrance.

In testimony whereof, I affix my signature, in presence of two witnesses.

JASPER L. HAYES.

Witnesses:
H. T. GIBSON,
J. W. LYNCH.

Copies of this patent may be obtained for five cents each, by addressing the "Commissioner of Patents, Washington, D. C."